(12) United States Patent
Litvak et al.

(10) Patent No.: US 12,189,525 B2
(45) Date of Patent: Jan. 7, 2025

(54) SYSTEM AND METHOD FOR DEFERRED PROCESSING OF METADATA LOG FLUSH OPERATIONS

(71) Applicant: Dell Products L.P., Round Rock, TX (US)

(72) Inventors: Michael Litvak, Shoham (IL); Vladimir Shveidel, Pardes-Hana (IL)

(73) Assignee: Dell Products L.P., Round Rock, TX (US)

( * ) Notice: Subject to any disclaimer, the term of this patent is extended or adjusted under 35 U.S.C. 154(b) by 64 days.

(21) Appl. No.: 18/156,702

(22) Filed: Jan. 19, 2023

(65) Prior Publication Data
US 2024/0248838 A1 Jul. 25, 2024

(51) Int. Cl.
*G06F 12/02* (2006.01)

(52) U.S. Cl.
CPC .. *G06F 12/0246* (2013.01); *G06F 2212/7207* (2013.01)

(58) Field of Classification Search
CPC .............. G06F 12/0246; G06F 2212/7207
See application file for complete search history.

(56) References Cited

U.S. PATENT DOCUMENTS

| | | | |
|---|---|---|---|
| 2012/0210041 A1* | 8/2012 | Flynn | H05K 7/1444 711/3 |
| 2017/0139768 A1* | 5/2017 | Camp | G06F 3/0647 |
| 2017/0212690 A1* | 7/2017 | Babu | G06F 3/0685 |
| 2021/0326068 A1* | 10/2021 | Li | H03M 13/05 |

* cited by examiner

*Primary Examiner* — Tasnima Matin
(74) *Attorney, Agent, or Firm* — Brian J. Colandreo; Heath M. Sargeant; Holland & Knight LLP

(57) ABSTRACT

A method, computer program product, and computing system for identifying a plurality of candidate pages associated with a page consolidation operation. A metadata log entry is generated with information concerning the page consolidation operation, thus defining a page consolidation metadata log entry. The page consolidation operation is processed when at least a threshold number of page consolidation metadata log entries are generated.

20 Claims, 8 Drawing Sheets

12

SYSTEM AND METHOD FOR DEFERRED PROCESSING OF METADATA LOG FLUSH OPERATIONS

BACKGROUND

Storing and safeguarding electronic content may be beneficial in modern business and elsewhere. Accordingly, various methodologies may be employed to protect and distribute such electronic content.

For example, data is flushed from a metadata log architecture by asynchronously destaging data from the metadata log to a persistent memory location (e.g., a metadata page within a storage array). In some implementations, when flushing a metadata page modifies a parent-child relationship for the metadata page (e.g., during a page consolidation operation), a parent metadata page becomes redundant and a candidate may be identified for a consolidation operation with its child (e.g., a merge operation). The straightforward approach uses a metadata page-based approach to maintain a list of candidate metadata pages for a background consolidation process.

However, conventional approaches introduce significant overhead. For example, conventional approaches require the flush process to pre-allocate space (e.g., where new merge candidates or candidates of other page consolidation operations will be written). The exact number of pages needed is not known until the actual processing, therefore, these conventional approaches allocate space sufficient for a worst-case number of new entries, which may be much larger than the actual number of entries added in a specific transaction. Further, depending on the implementation of the allocator, the allocation request may trigger additional processing for finding and reclaiming new metadata pages, especially when the storage system is low on resources. Finally, the page-based allocator approach may work in granularity of full metadata pages. If the number of entries added in each operation is small, this results in many small and redundant allocations, and sparse pages with high fragmentation which may cause additional work for defragmentation. In this manner, write amplification is increased due to writing full metadata pages, even when there are only few entries added.

SUMMARY OF DISCLOSURE

In one example implementation, a computer-implemented method executed on a computing device may include, but is not limited to, identifying a plurality of candidate pages associated with a page consolidation operation. A metadata log entry is generated with information concerning the page consolidation operation, thus defining a page consolidation metadata log entry. The page consolidation operation is processed when at least a threshold number of page consolidation metadata log entries are generated.

One or more of the following example features may be included. Identifying the plurality of candidate pages may include identifying the plurality of candidate pages during flushing of the plurality of candidate pages to persistent storage. The page consolidation operation may be a merge operation. The page consolidation operation may be a garbage collection operation. Generating the page consolidation metadata log entry may include generating a binary search tree including each page consolidation metadata log entry. Processing the page consolidation operation may include allocating one or more additional pages in a list of pages. The one or more additional pages from the list of pages with the plurality of candidate pages based upon, at least in part, the binary search tree.

In another example implementation, a computer program product resides on a computer readable medium that has a plurality of instructions stored on it. When executed by a processor, the instructions cause the processor to perform operations that may include, but are not limited to, identifying a plurality of candidate pages associated with a page consolidation operation. A metadata log entry is generated with information concerning the page consolidation operation, thus defining a page consolidation metadata log entry. The page consolidation operation is processed when at least a threshold number of page consolidation metadata log entries are generated.

One or more of the following example features may be included. Identifying the plurality of candidate pages may include identifying the plurality of candidate pages during flushing of the plurality of candidate pages to persistent storage. The page consolidation operation may be a merge operation. The page consolidation operation may be a garbage collection operation. Generating the page consolidation metadata log entry may include generating a binary search tree including each page consolidation metadata log entry. Processing the page consolidation operation may include allocating one or more additional pages in a list of pages. The one or more additional pages from the list of pages with the plurality of candidate pages based upon, at least in part, the binary search tree.

In another example implementation, a computing system includes at least one processor and at least one memory architecture coupled with the at least one processor, wherein the at least one processor is configured to identify a plurality of candidate pages associated with a page consolidation operation. A metadata log entry is generated with information concerning the page consolidation operation, thus defining a page consolidation metadata log entry. The page consolidation operation is processed when at least a threshold number of page consolidation metadata log entries are generated.

One or more of the following example features may be included. Identifying the plurality of candidate pages may include identifying the plurality of candidate pages during flushing of the plurality of candidate pages to persistent storage. The page consolidation operation may be a merge operation. The page consolidation operation may be a garbage collection operation. Generating the page consolidation metadata log entry may include generating a binary search tree including each page consolidation metadata log entry. Processing the page consolidation operation may include allocating one or more additional pages in a list of pages. The one or more additional pages from the list of pages with the plurality of candidate pages based upon, at least in part, the binary search tree.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
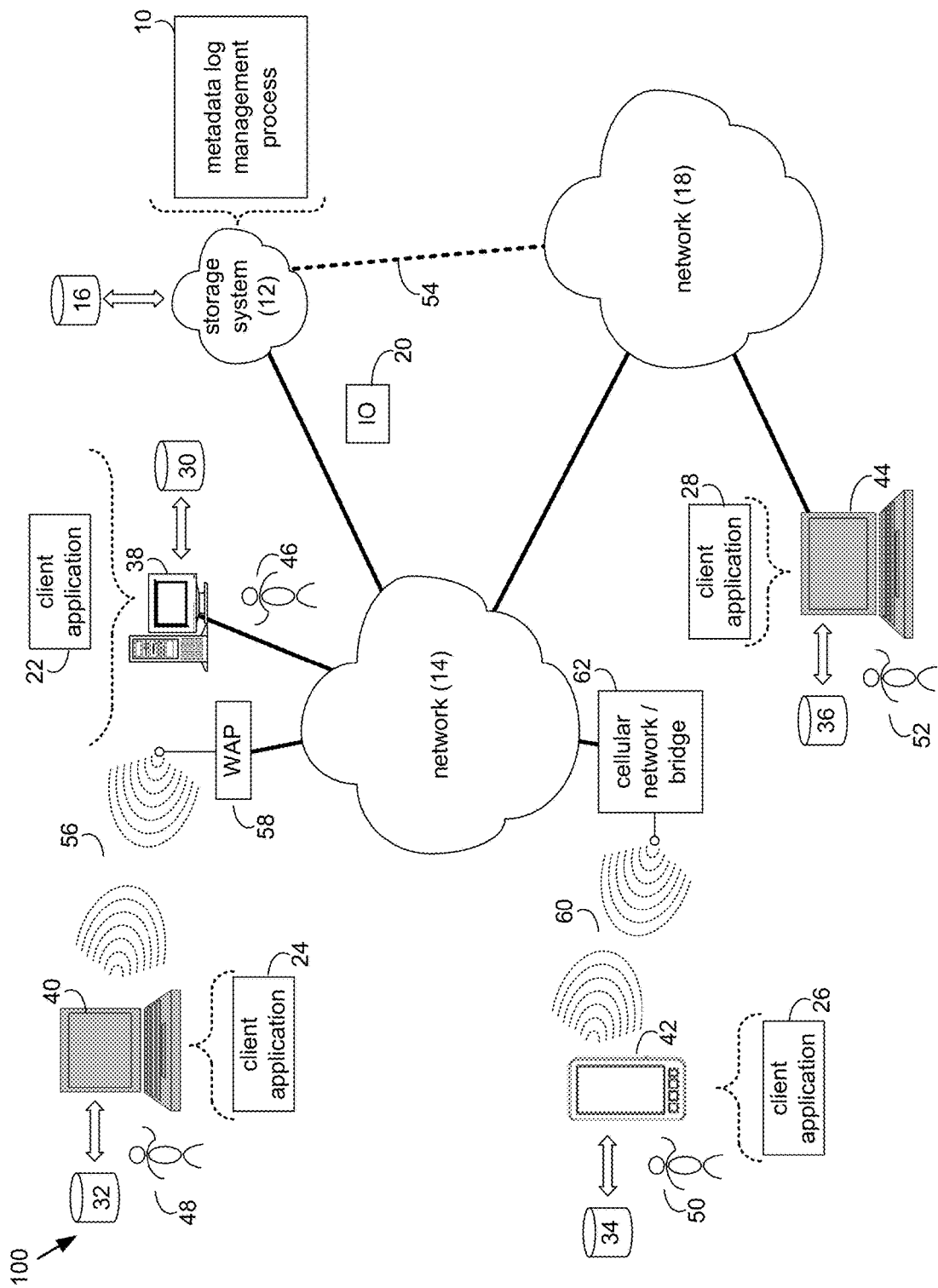
FIG. 1 is an example diagrammatic view of a storage system and a metadata log management coupled to a distributed computing network according to one or more example implementations of the disclosure.

System Overview:

Referring to FIG. 1, there is shown metadata log management 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of metadata log management 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of metadata log management 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a metadata log management, such as metadata log management 10 of FIG. 1, may include but is not limited to, identifying a plurality of candidate pages associated with a page consolidation operation. A metadata log entry is generated with information concerning the page consolidation operation, thus defining a page consolidation metadata log entry. The page consolidation operation is processed when at least a threshold number of page consolidation metadata log entries are generated.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
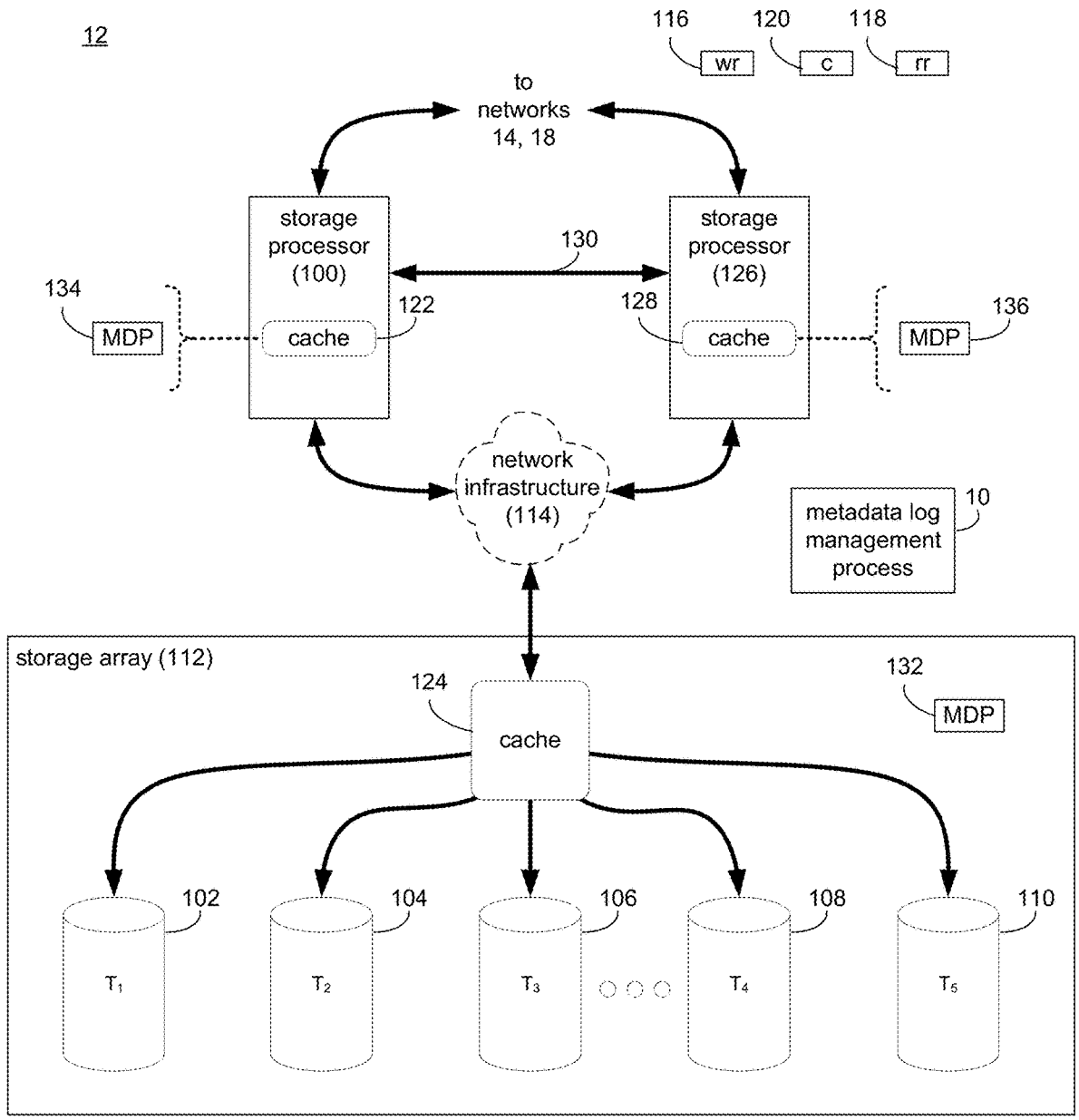
FIGS. 2-3 are example diagrammatic views of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of metadata log management 10. The instruction sets and subroutines of metadata log management 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of metadata log management 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of metadata log management 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of metadata log management 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 126), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 126 may function like storage processor 100. For example, during operation of storage processor 126, content 118 to be written to storage system 12 may be processed by storage processor 126. Additionally/alternatively and when storage processor 126 is configured as an application server, content 118 to be written to storage system 12 may be internally generated by storage processor 126.

Storage processor 126 may include frontend cache memory system 128. Examples of frontend cache memory system 128 may include but are not limited to a volatile, solid-state, cache memory system (e.g., a dynamic RAM cache memory system) and/or a non-volatile, solid-state, cache memory system (e.g., a flash-based, cache memory system).

Storage processor 126 may initially store content 118 within frontend cache memory system 126. Depending upon the manner in which frontend cache memory system 128 is configured, storage processor 126 may immediately write content 118 to data array 112 (if frontend cache memory system 128 is configured as a write-through cache) or may subsequently write content 118 to data array 112 (if frontend cache memory system 128 is configured as a write-back cache).

In some implementations, the instruction sets and subroutines of node fencing process 10, which may be stored on storage device 16 included within storage system 12, may be executed by one or more processors (not shown) and one or more memory architectures (not shown) included within storage system 12. Accordingly, in addition to being executed on storage processor 126, some or all of the instruction sets and subroutines of node fencing 10 may be executed by one or more processors (not shown) and one or more memory architectures (not shown) included within data array 112.

Further and as discussed above, during the operation of data array 112, content (e.g., content 118) to be written to data array 112 may be received from storage processor 126 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

As discussed above, storage processor 100 and storage processor 126 may be configured in an active/active configuration where processing of data by one storage processor may be synchronized to the other storage processor. For example, data may be synchronized between each storage processor via a separate link or connection (e.g., connection 130).

Metadata Architecture:

In the context of storage systems, metadata may generally include useful internal information managed by a storage array to describe and locate user data. Modern storage arrays abstract the physical media and present logical (virtualized) addresses to clients in the form of LUNs. The mapping between the logical address and physical address is a form of metadata that the array needs to manage. That is typically the most common form of metadata for SAN storage systems. Newer architectures manage additional metadata to implement additional capabilities. For example, snapshots, change tracking for efficient remote replication, deduplication pointers, and compression all involve managing some form of metadata.

The classic metadata structure of traditional storage systems directly links a Logical Address of a Block to the Physical Location of the Block. In this metadata structure, every logical block written, has a physical block linked directly to it. In addition, as most traditional storage systems were architected for a spinning disk storage medium optimized for sequential writes the address of the logical address affects the physical location that the data is stored. This can lead to an unbalanced storage array that can suffer from hot-spots as specific address space ranges may experience more performance/IOPs than other address space ranges.

Embodiments of the present disclosure may support a flash/random access medium. For example, embodiments of the present disclosure may include a metadata structure that completely decouples the Logical Block Address space address from the physical one. This is done by leveraging a multi-layer architecture.

Figure 3:
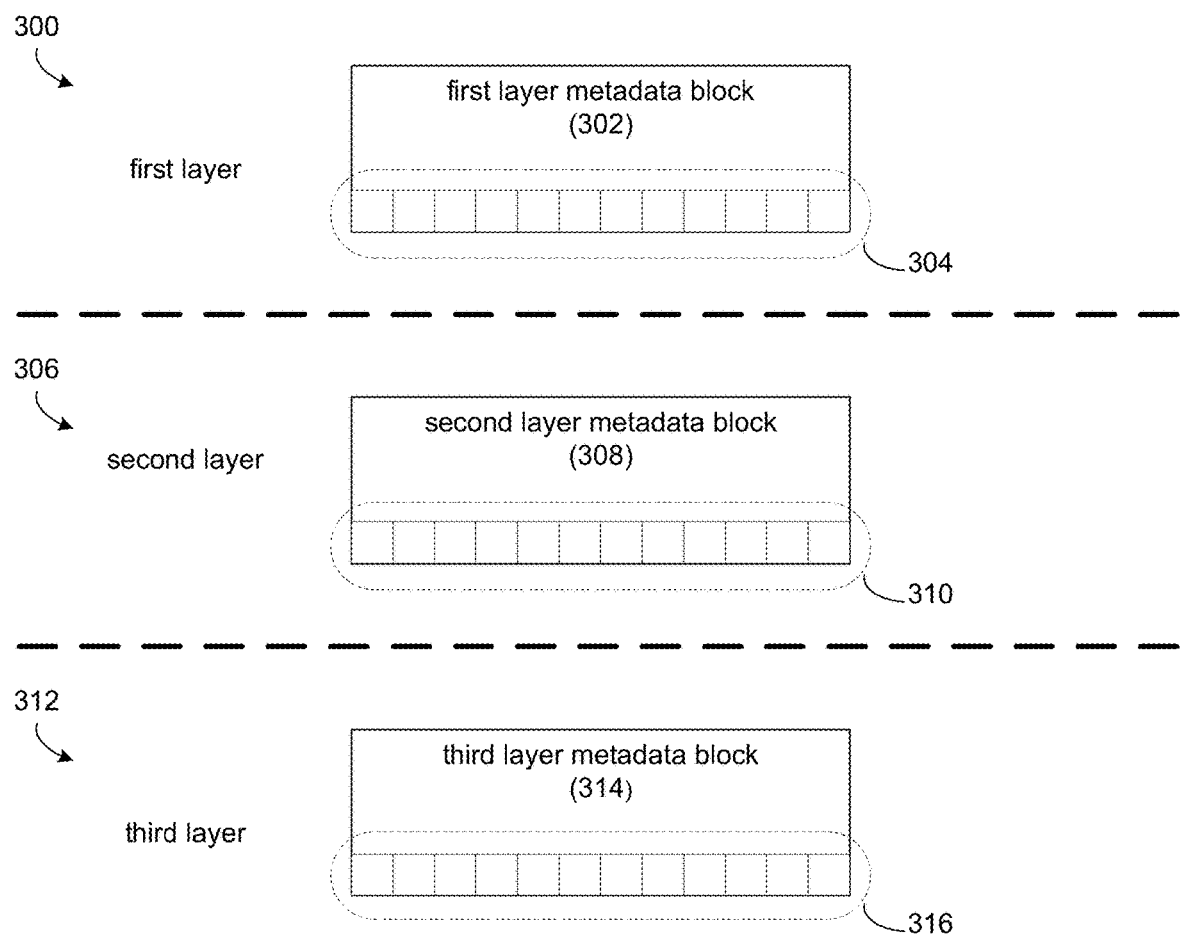

Referring also to FIG. 3, a storage system may generally include three layers of metadata blocks. While the following example includes metadata "blocks", it will be appreciated that other units of data storage may be used within the scope of the present disclosure. For example, a metadata block may be referred to as a metadata page. In another example, a combination of a number of metadata blocks may define a metadata page. In this manner, it will be appreciated that the term "metadata page" may represent an individual metadata block or a grouping of metadata blocks. In some implementations, a first layer (e.g., first layer 300) may include first layer metadata blocks (e.g., first layer metadata block 302) with a plurality of entries (e.g., plurality of entries 304) that map or point to a plurality of entries of one or more second layer metadata blocks. The first layer may (e.g., first layer 300) represent various ranges of Logical Block Addresses (LBAs). For example, each entry of the plurality of entries (e.g., plurality of entries 304) of the first layer metadata blocks (e.g., first layer metadata block 302) may be associated with a LBA range. In some implementations, the first layer (e.g., first layer 300) may be organized in a "tree" data structure where each "leaf" of the "tree" data structure corresponds to a specific LBA range. Accordingly, each first layer metadata block (e.g., first layer metadata block 302) may hold mapping of a LBA to a second layer metadata block. It will be appreciated that other data structures may be used within the scope of the present disclosure to organize the first layer.

In some implementations, a second layer (e.g., second layer 306) may include second layer metadata blocks (e.g., second layer metadata block 308) with a plurality of entries (e.g., plurality of entries 310) that map to a plurality of entries of one or more third layer metadata blocks. The second layer (e.g., second layer 306) may generally isolate the logical address of a block from the physical location of the block. For example, a second layer metadata block (e.g., second layer metadata block 308) may encapsulate the physical location of user data and allow relocation without updating first layer metadata blocks (e.g., first layer metadata block 302). Accordingly, the second layer (e.g., second layer 306) may decouple the Logical Block Address space address from the physical one. As will be discussed in greater detail below, second layer metadata blocks (e.g., second layer metadata block 308) may be stored in a storage array (e.g., on one of storage targets 102, 104, 106, 108 of storage array 112).

In some implementations, a third layer (e.g., third layer 312) may include third layer metadata blocks (e.g., third layer metadata block 314) with a plurality of entries or portions (e.g., plurality of entries 316) that are configured to store user data. In this manner, the third layer (e.g., third layer 312) may describe the physical location of user data in a storage system. In some implementations, each third layer metadata block (e.g., third layer metadata block 314) may have a predefined amount of storage capacity for storing metadata (e.g., user data). As will be discussed in greater detail below, third layer metadata blocks (e.g., third layer metadata block 314) may be stored in a storage array (e.g., on one of storage targets 102, 104, 106, 108 of storage array 112).

Metadata Log Architecture:

In some implementations, various operations may be performed on metadata pages (e.g., second layer metadata block 308) in a storage system. For example, operations that may be performed on the metadata pages (e.g., metadata page (MDP)) may generally include writing new pages or blocks of user data to a storage array, performing deduplication on existing data, removing data, garbage collection operations, etc. In some implementations, each node (e.g., storage processor 100, 126) may include a cache memory system configured to manage or handle these operations (e.g., TxCache component 122, 128). In some implementations, each TxCache component (e.g., TxCache component 122, 128) may be configured (e.g., by metadata log management 10) to manage locks on metadata pages, provide transactional protection for composite updates requiring multiple page writes atomically, provide a least recently used (LRU) cache for metadata pages in order to avoid excessive reading of the metadata blocks from the storage array, and LRU cache invalidation (e.g., invalidation of an existing metadata page on one node in response to updating the metadata page on another node).

In some implementations and as will be discussed in greater detail below, metadata log management 10 may store updates or "deltas" for a metadata page rather than doing a full read modify process. Deltas may be aggregated in data containers called "tablets"; first in a cache memory system in an "active tablet." When active tablet is full, metadata log management 10 may destage the active tablet to the storage array. In some implementations, metadata log management 10 may aggregate several tablets on the storage array. Tablets within the storage array may be divided into two batches. Once a batch is full, metadata log management 10 may destage the batch (i.e., the aggregated tablets) to a metadata page store. Metadata log management 10 may read the previous metadata page from the storage array and may apply the deltas of the destaged batch. However, metadata log management 10 may apply deltas from tablets in destage only, meaning that the updated metadata page (i.e., current metadata page with applied deltas from destaged batch) is not up-to-date with all deltas as only one batch may be in destage at a time.

Accordingly, the destaging or flushing of deltas may be detached from the cache memory system, meaning that this process does not destage up-to-date pages to the metadata store and does not update to the cache memory system. This allows destaging to not block user writes, since a write operation is adding new deltas to the active tablet. In addition, this approach may also prevent any reclaiming of an active tablet, since metadata log management 10 may destage only half of the tablets while the active tablet is destaged to another batch.

In some implementations, metadata log management 10 may receive, at a node of a multi-node storage system, one or more updates or deltas to a metadata page. As discussed above and in some implementations, a metadata page may generally include a reference to a physical location of user data within a storage array. Referring again to the example of FIG. 3 and in some implementations, a metadata page (e.g., second layer metadata block 308) may encapsulate the physical location of user data and allow relocation without updating first layer metadata blocks (e.g., first layer metadata block 302). Accordingly, the terms "metadata block", "metadata page", and "second layer metadata block" may be used interchangeably throughout the present disclosure.

Referring again to the example of FIG. 2, suppose a node (e.g., storage processor 100) receives one or more updates to a metadata page (e.g., metadata page 132). As discussed above, metadata pages may be stored in a storage array (e.g., storage array 112) and cached copies of the metadata pages may be temporarily stored in cache memory systems of nodes coupled to the storage array (e.g., metadata page 134 in cache memory system 122 of storage processor 100 and metadata page 136 in cache memory system 128 of storage processor 126, where each of metadata pages 134, 136 are cached copies of metadata page 132). While the example of FIG. 2 shows a cached copy of metadata page 132 in both cache memory systems 122, 128 of storage processors 100, 126, it will be appreciated that each storage processor may or may not have a cached copy of a metadata page within its cache memory system at a given time. For example, suppose metadata page 134 is invalidated. In this example, storage processor 100 would need to re-cache a copy of metadata page 132 from storage array 112 into cache memory system 122.

In some implementations, metadata log management 10 may store one or more metadata page deltas associated with the metadata page in a cache memory system of the node. For example, metadata log management 10 may store the one or more metadata page deltas in a data container associated with a specific metadata page. In some implementations, a data container may generally include a data structure for storing one or more metadata changes or metadata page deltas. Each data container or bucket of the one or more data containers or buckets may be associated with a particular metadata page. For example and as will be discussed in greater detail below, each data container may store one or more reference count changes or deltas associated with a particular metadata page or block. The one or more data containers may be stored in volatile memory. Volatile memory may generally include any temporary memory of a storage system. In one example, the memory may include Random Access Memory (RAM) based storage within a storage processor/node (e.g., cache memory system 122). RAM-based memory system may include non-persistent RAM-based storage. As is known in the art, non-persistent RAM-based storage is RAM-based storage that will lose its data in the event of e.g., a power failure. However, it will be appreciated that other forms or types of volatile memory may be used within the scope of the present disclosure.

In some implementations, metadata log management 10 may receive one or more metadata page deltas associated with a metadata page. As discussed above, a storage processor (e.g., storage processor 100) may receive an operation that may specify a change to a metadata page within the storage array (e.g., data array 112). Accordingly, the one or more deltas may specify changes to a metadata page in the storage array.

Figure 4:
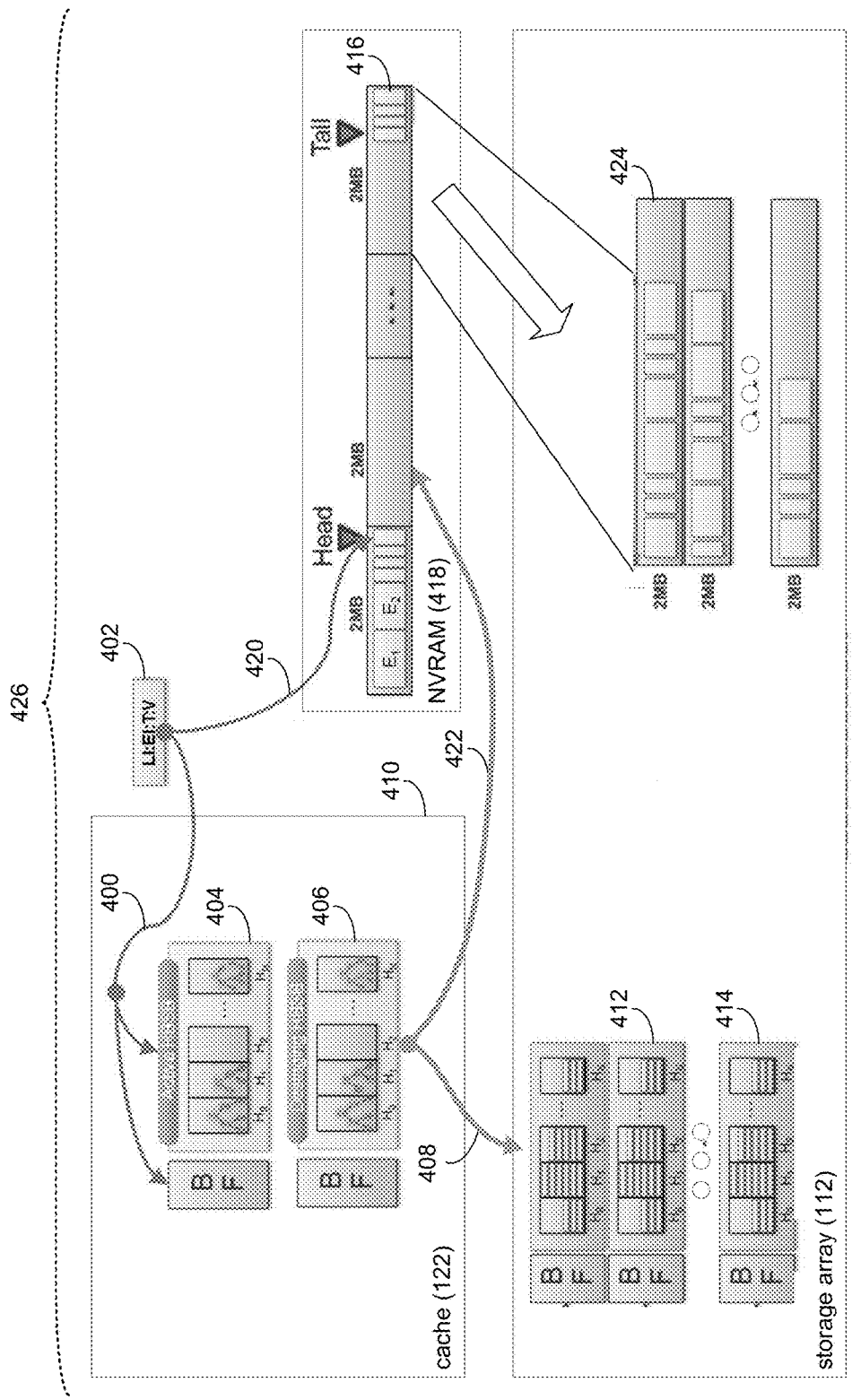
FIGS. 4-6 are example diagrammatic views of the metadata log management of FIG. 1 according to one or more example implementations of the disclosure.

Referring also to FIG. 4 and in some implementations, metadata log management 10 may route (represented by arrow 400) each metadata page delta (e.g., metadata page delta 402) to a specific data container or bucket of the one or more data containers. In some implementations, each data container of the one or more data containers (e.g., one or more data containers 404, 406) may be organized as a binary tree of metadata page deltas. For example, upon writing the metadata page delta to a specific data container, metadata log management 10 may sort the metadata page deltas based upon, at least in part, an insertion order. In other words, each metadata page delta may be sorted in the binary tree structure within the data container based on when the metadata page delta was received. While a binary tree structure has been described, it will be appreciated that various sorting algorithms or data structures may be used within the scope of the present disclosure.

In some implementations, metadata log management 10 may write one or more metadata page deltas associated with a metadata page stored in a storage array, to the plurality of tablets in the cache memory system. Referring again to FIGS. 2 and 4 and returning to the above example where storage processor 100 receives one or more metadata page deltas associated with metadata page 132, metadata log management 10 may write one or more metadata page deltas (e.g., metadata page delta 402) in cache memory system 122. Specifically, metadata log management 10 may write the one or more metadata page deltas (e.g., metadata page delta 402) in one or more data storage containers within a plurality of tablets (e.g., tablets 404, 406). In one example, metadata log management 10 may write the one or more metadata page deltas (e.g., metadata page delta 402) in a data storage container associated with metadata page 132.

In some implementations, metadata log management 10 may write the one or more metadata page deltas to an active tablet. An active tablet may generally include a tablet with one or more data containers (e.g., a data container for each metadata page). In some implementations, each tablet may have a predefined storage capacity (e.g., as a portion of the total cache memory system size). Accordingly, when the active tablet is full, metadata log management 10 may switch the active tablet with an empty tablet. The active tablet may then be destaged to the storage array (i.e., a destaging tablet). As will be discussed in greater detail below, destaging may generally include writing the one or more metadata changes from a set of data containers to the storage array.

For example and as shown in FIG. 4, metadata log management 10 may write the one or more metadata page deltas (e.g., metadata page delta 402) in one or more data storage containers within an active tablet. In one example, suppose tablet 406 is the "active" tablet. In this example, metadata log management 10 may write the one or more metadata page deltas (e.g., metadata page delta 402) in one or more data storage containers within tablet 406. When tablet 406 is full (e.g., based on one or more predefined thresholds for tablet 406), metadata log management 10 may switch active tablet 406 with an empty tablet (e.g., tablet 404). In this example, tablet 404 may be the active table for writing the one or more metadata page deltas associated with a metadata page and tablet 406 may be the destaging tablet. In some implementations, metadata change aggregation process 10 may write one or more subsequent metadata changes to active tablet 404.

In some implementations, metadata log management 10 may write each metadata page delta stored in at least one tablet of the plurality of tablets, to the metadata page stored in the storage array, thus defining one or more destage tablets. For example, writing the one or more metadata page deltas stored in at least one tablet of the plurality of tablets to the storage array may include writing or flushing the at least one tablet to the storage array. For example and referring again to the example of FIG. 4, metadata log management 10 may write (represented with arrow 408) the destaging tablet (e.g., tablet 406) to the storage array (e.g., data array 112). In this manner, metadata log management 10 may aggregate multiple destage tablets (e.g., destage tablets 410, 412, 414) within data array 112 before writing the one or more metadata updates to the metadata page.

As discussed above and in some implementations, the destage tablets may include a plurality of data container pages that have a pre-defined size of a metadata page (e.g., 4 KB). Similar to the set of data containers stored in the cache memory system, each tablet of delta container pages may have a delta container page associated with a respective metadata page. In some implementations, a delta container page may sort the one or more metadata changes for a particular metadata page by insertion time. In some implementations, a set of tablets (e.g., tablets 410, 412, 414) may be organized in a storage array (e.g., storage array 112) as a ring buffer. For example, a tablet may be added to a "head"

of the ring buffer and released or deleted from a "tail" of the ring buffer. The process of releasing or deleting tablet will be described in greater detail below.

In some implementations, metadata log management 10 may write the one or more metadata page deltas to a metadata journal in non-volatile memory. Referring again to the example of FIG. 4 and in some implementations, metadata log management 10 may generate a metadata journal (e.g., metadata journal 416) in non-volatile memory (e.g., non-volatile Random Access Memory (NVRAM) 418). In some implementations, the metadata journal may store (indicated by arrow 420) metadata page deltas in time order (e.g., sorted oldest to newest). In some implementations, the contents (e.g., metadata page delta 402) of the may preserved in the event of a power failure or other failure of the cache memory system. In some implementations and in response to the failure of the cache memory system, metadata log management 10 may recover the one or more metadata page deltas from the metadata journal (e.g., metadata journal 416).

In some implementations and in response to destaging or writing the one or more metadata page deltas to the storage array (e.g., writing the tablets from the cache memory system to the storage array), metadata log management 10 may release or free (indicated by arrow 422) the corresponding part of the metadata journal (e.g., metadata journal 416). In some implementations, metadata log management 10 may determine that the metadata journal (e.g., metadata journal 416) is full and may write at least a portion of the one or more metadata page deltas stored in the metadata journal to the storage array (e.g., data array 112). In some implementations, the at least a portion of the one or more metadata page deltas written to the storage array may be stored as e.g., 2 MB chunks (e.g., data chunk 424) in the storage array (e.g., storage array 112). While a 2 MB chunk has been discussed, it will be appreciated that the at least a portion of the one or more metadata page deltas may be stored in various chunks or blocks of varying sizes.

As will be discussed in greater detail below, the combination of data storage containers 404, 406 and metadata journal 416 may define a metadata log architecture (e.g., metadata log 426). For example, with data storage containers 504, 506 and metadata journal 416, metadata log management 10 may asynchronously flush or destage data from metadata log 426 to persistent storage (e.g., storage array 112).

In some implementations, metadata log management 10 may aggregate the one or more metadata page deltas and write the one or more metadata page deltas to the metadata page. For example, metadata log management 10 may combine a plurality of metadata page deltas associated with a metadata page from the destage tablets in the storage array. Referring also to the example of FIG. 5, metadata log management 10 may combine a delta container page associated with a particular metadata page from at least one tablet (e.g., destage tablets 500, 502, 504, 506), thus defining a batch (e.g., batches 508, 510, 512, 514).

Figure 5:
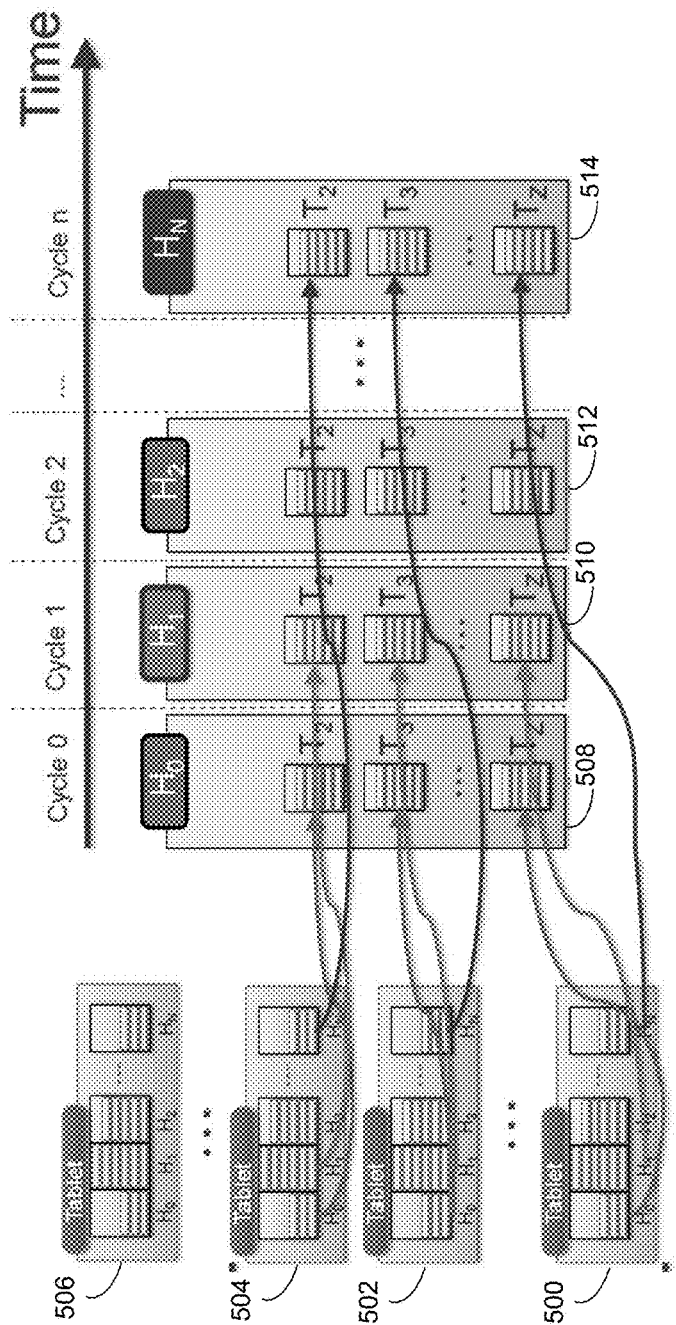

As shown in the example of FIG. 5, destage tablets 500, 502, 504, 506 may include metadata page deltas associated with (in this example) four metadata pages. Accordingly, metadata log management 10 may combine the metadata page deltas from each of the destage tablets (e.g., destage tablets 500, 502, 504, 506) for each metadata page to define a batch for each metadata page (e.g., batches 508, 510, 512, 514). In some implementations, metadata log management 10 may generate one batch per cycle. While a single batch per cycle has been described, it will be appreciated that any number of batches may be generated per any number of cycles.

Figure 6:
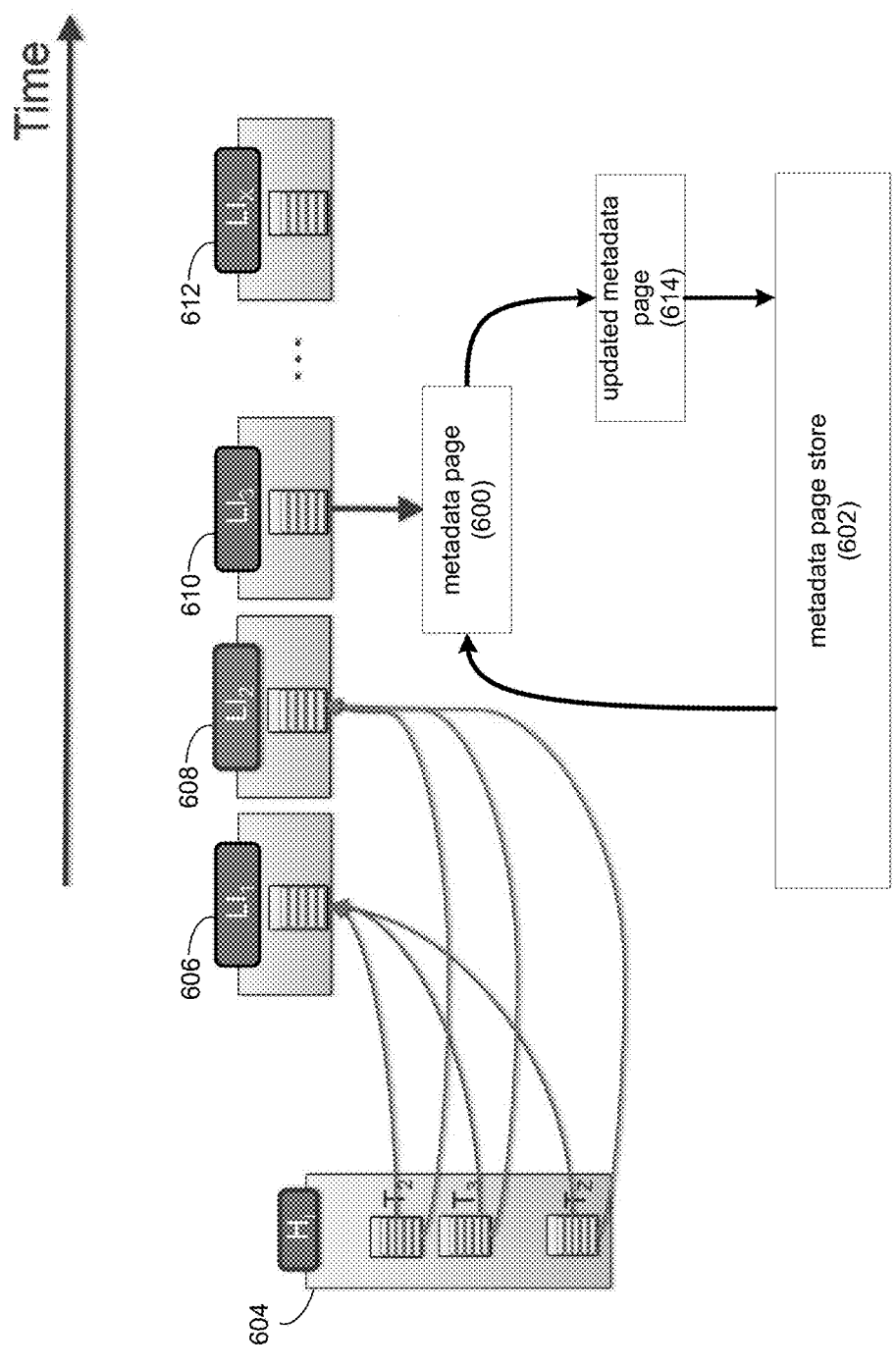

Referring also to the example of FIG. 6 and in some implementations, metadata log management 10 may read the metadata page from the storage array. In some implementations, the metadata page (e.g., metadata page 600 as shown in FIG. 6) may be read from a metadata page store (e.g., metadata page store 602) on the storage array (data array 112). In some implementations, metadata log management 10 may merge the one or more metadata page deltas from the batches of FIG. 5 and the metadata page read from the storage array, thus defining an updated metadata page. As shown in FIG. 6 and in some implementations, metadata log management 10 may sort the first portion of the one or more metadata page deltas from a plurality of batches (e.g., batch 604) by time, thus defining an aggregated list of metadata page deltas (e.g., aggregated lists 606, 608, 610, 612) for each metadata page. In response to sorting the one or more metadata page deltas from the batches to define the aggregated list, metadata log management 10 may merge the aggregated list (e.g., aggregated list 610) and the metadata page read from the storage array (e.g., metadata page 600) to generate an updated metadata page (e.g., updated metadata page 614). In some implementations, metadata log management 10 may write the updated metadata page to the storage array (including the first portion of the one or more metadata page deltas).

Figure 7:
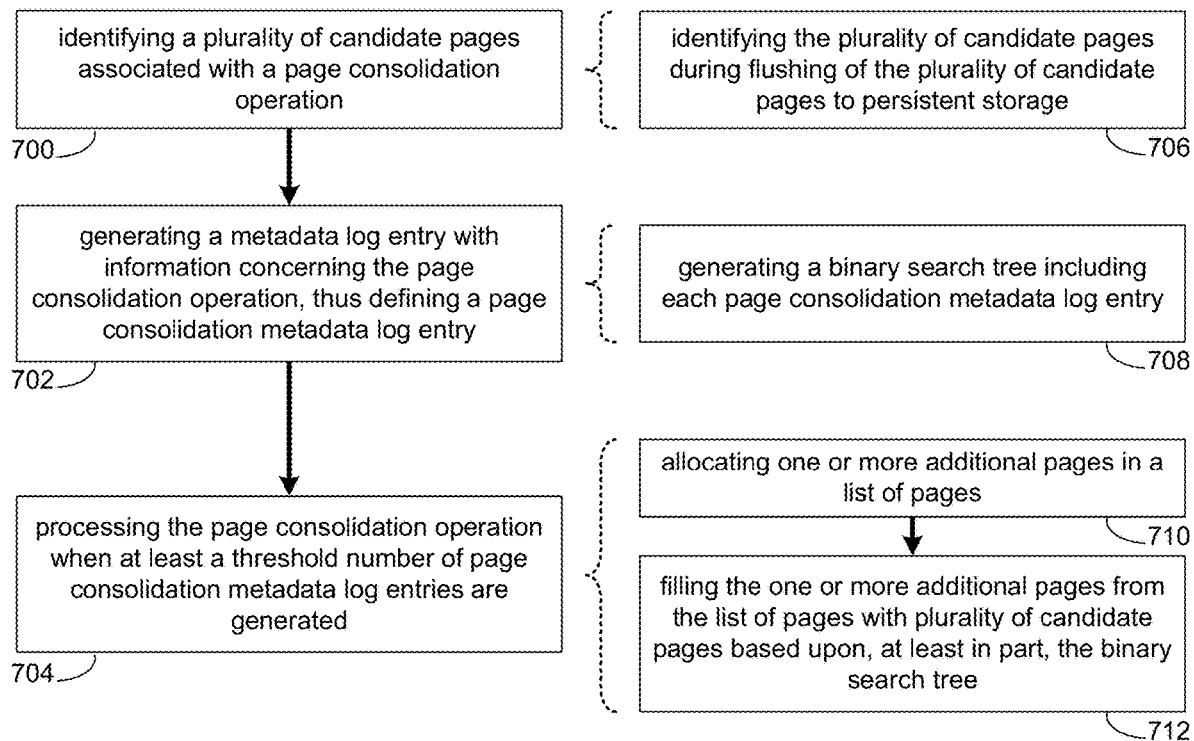
FIG. 7 is an example flowchart of the metadata log management of FIG. 1 according to one or more example implementations of the disclosure.
Figure 8:
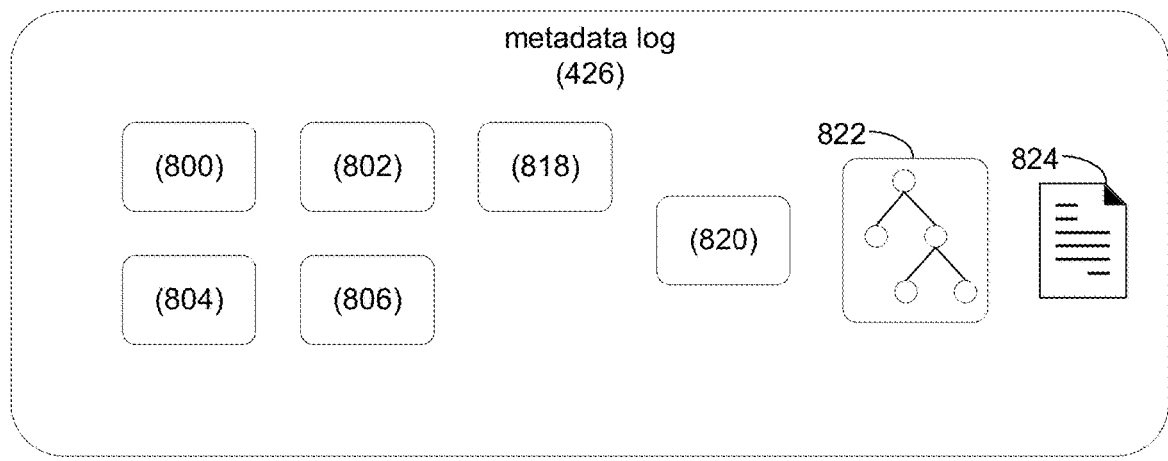
FIG. 8 is an example diagrammatic view of the metadata log management of FIG. 1 according to one or more example implementations of the disclosure.
Figure 8:
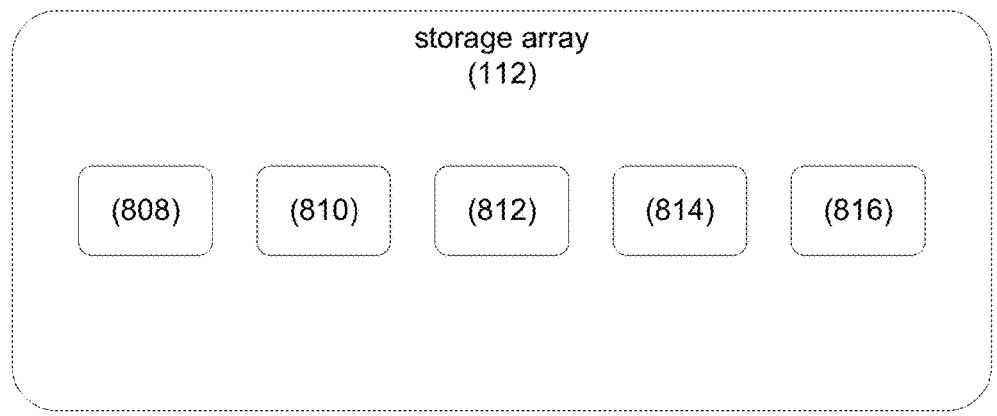

The Metadata Log Management Process:

Referring also to FIGS. 7-8 and in some implementations, metadata log management 10 may identify 700 a plurality of candidate pages associated with a page consolidation operation. A metadata log entry is generated 702 with information concerning the page consolidation operation, thus defining a page consolidation metadata log entry. The page consolidation operation is processed 704 when at least a threshold number of page consolidation metadata log entries are generated.

As will be discussed in greater detail below, implementations of the present disclosure allow for enhanced metadata log flushing for deferrable operations. For example, data is flushed from a metadata log architecture (e.g., metadata log 426) by asynchronously destaging data from metadata log 426 to a persistent memory location (e.g., metadata page within storage array 112). In some implementations, when flushing a metadata page modifies a parent-child relationship for the metadata page (e.g., during a page consolidation operation), metadata log management 10 may detect that a parent metadata page becomes redundant and a candidate for a consolidation operation with its child (e.g., a merge operation). The straightforward approach uses a metadata page-based approach to maintain a list of candidate metadata pages for a background consolidation process.

However, conventional approaches introduce significant overhead. For example, conventional approaches require the flush process to pre-allocate space (e.g., where new merge candidates or candidates of other page consolidation operations will be written). The exact number of pages needed is not known until the actual processing, therefore, these conventional approaches allocate space sufficient for a worst-case number of new entries, which may be much larger than the actual number of entries added in a specific transaction. Further, depending on the implementation of the allocator, the allocation request may trigger additional processing for finding and reclaiming new metadata pages, especially when the storage system is low on resources.

Finally, the page-based allocator approach may work in granularity of full metadata pages. If the number of entries added in each operation is small, this results in many small and redundant allocations, and sparse pages with high fragmentation, which may cause additional work for defragmentation. In this manner, write amplification is increased due to writing full metadata pages, even when there are only few entries added. Accordingly, the latency of flushing is increased in conventional approaches by the work required to access and modify these metadata pages.

As will be discussed in greater detail below, implementations of the present disclosure modify the flushing of metadata pages for these page consolidation operations so that when a candidate page is identified for a page consolidation operation (e.g., a merge operation), instead of using the page list allocator directly to write the page, metadata log management 10 commits a metadata log entry which includes the candidate page address and additional data that is required for the page consolidation operation. Metadata log infrastructure is used to aggregate these entries until there is at least a threshold number of them. A background process allocates space for the entries and flushes them in amortized way. Accordingly, metadata log management 10 makes more efficient use of the page allocator by allocating pages as needed, and as such, improving page utilization and reducing write amplification. Additionally, metadata log management 10 offloads the bulk of the page list-related processing from the flush operation to a background process, thus reducing the latency of flush operations.

In some implementations, metadata log management 10 identifies 700 a plurality of candidate pages associated with a page consolidation operation. As discussed above, a "page" may include a metadata page, which represents an individual metadata block, or a grouping of metadata blocks as shown in FIG. 3. In some implementations, metadata log management 10 may maintain a metadata page store (e.g., metadata page store 702) with a plurality of metadata pages. During processing of IO operations on the storage system, metadata log management 10 may receive a plurality of metadata page deltas (e.g., metadata page delta 502) describing a type of change or modification to the metadata page. As discussed above, these metadata page deltas may be aggregated and processed in batches to facilitate more efficient write amortization.

In some implementations, metadata log management 10 may identify 700 a plurality of candidates pages or candidate metadata pages for a particular page consolidation operation. For example, a page consolidation operation may generally include an operation that is used during flushing of the metadata pages from a metadata log to reduce multiple metadata pages into a subset of metadata pages. Examples of page consolidation operations include merge operations (i.e., the merging of a pair of metadata pages), garbage collection (i.e., the reallocation of memory that was previous allocated but is no longer referenced), and other operations. In some implementations, the page consolidation operation does not include a read operation or a write operation. Rather, the page consolidation operation may include operations on one or more metadata pages that include using a page allocator to allocate new metadata pages in the metadata page store. As will be discussed in greater detail below, page consolidation operations may be deferrable during flushing or destaging of metadata page deltas associated with metadata pages or metadata pages generally. In this manner, metadata log management 10 may defer these page consolidation operations to a background process separate from flushing.

In some implementations, identifying 700 the plurality of candidate pages includes identifying 706 the plurality of candidate pages during flushing of the plurality of candidate pages to persistent storage. Referring also to FIG. 8, suppose that storage system 12 includes metadata log 426 and storage array 112 where metadata log 426 is temporary storage for metadata page deltas and/or metadata pages before persisting these metadata page deltas and/or metadata pages to storage array 112. As shown in the example of FIG. 8, metadata log 426 may include a plurality of metadata page deltas (e.g., metadata page deltas 800, 802, 804, 806) and storage array 112 may include a plurality of metadata pages (e.g., metadata pages 808, 810, 812, 814, 816). As discussed above, the process of moving these metadata page deltas and/or metadata pages from metadata log 528 to storage array 112 is called flushing.

In one example, suppose metadata log management 10 begins a flush process for flushing metadata page deltas 800, 802 associated with metadata page 808 and metadata page deltas 800, 802 associated with metadata page 808 to storage array 112. In this example, suppose that one or more of metadata page deltas 800, 802, 804, 806 describe the need to modify metadata pages 808 and 812 such that these metadata pages are to be merged. Conventional approaches would, in the process of flushing metadata page deltas 800, 802, 804, 806 allocate a worst-case representation of the memory within storage array 112 for storing the merged version of metadata pages 808 and 812. Further, these conventional approaches would complete the merge operation of metadata pages 808 and 812 during the flushing of metadata page deltas 800, 802, 804, 806. In this manner, flushing latency is reduced as actual flushing operations are extended to perform page allocation and page consolidation operations. As will be discussed in greater detail below, metadata log management 10 defers the processing of the page consolidation operation until a background process to enhance flushing latency and improve overall metadata page delta flushing from the metadata log to the persistent storage. In this example, metadata log management 10 may identify 700 metadata pages 808, 812 as candidate pages associated with a page consolidation operation (e.g., merging of metadata pages 808, 812).

In some implementations, metadata log management 10 generates 702 a metadata log entry with information concerning the page consolidation operation, thus defining a page consolidation metadata log entry. For example and as opposed to performing the pre-allocating of memory within storage array 112, metadata log management 10 may generate 702 a metadata log entry (e.g., metadata log entry 818) with information concerning the page consolidation operation. As will be discussed in greater detail below, the metadata log entry with information concerning a page consolidation operation may also be referred to as a "page consolidation metadata log entry". In one example, metadata log entry 818 is a metadata page delta that includes information associated with a particular page consolidation operation. In this manner, metadata log management 10 defers processing of the page consolidation operation by generating a metadata log entry (e.g., metadata log entry 818) that includes information concerning the page consolidation operation (e.g., a reference to the candidate metadata page(s), a type of page consolidation operation (e.g., merge operation), additional payloads for the page consolidation operation, such as volume ID, etc.). While examples of certain types of information concerning the page consolidation operation have been provided, it will be appreciated that these are for example purposes only and that various types of information may be included in metadata log entry 818 within the scope of the present disclosure.

In some implementations, metadata log management 10 maintains a counter of page consolidation metadata log entries. For example, for each page consolidation metadata log entry generated, metadata log management 10 may increment a count value of a counter (e.g., counter 820) of page consolidation metadata log entries. As will be discussed in greater detail below, metadata log management 10 may compare the count value of counter 820 against a threshold to determine whether or not to process the page consolidation operations represented by the page consolidation metadata log entries. In some implementations, as metadata log management 10 processes the page consolidation operations, metadata log management 10 may decrement the count value of counter 820 for each processed page consolidation metadata log entry processed.

In some implementations, metadata log management 10 may generate 708 a binary search tree including each page consolidation metadata log entry. For example, once a metadata log entry is generated with information concerning the page consolidation operation (e.g., metadata log entry 818), metadata log entry 818 is persisted and inserted into a metadata log in-memory data structure. Metadata log management 10 processes each metadata log entry with information concerning a page consolidation operation and hashes them into a data container or bucket by logical index. Metadata log management 10 generates 708 a dedicated binary search tree (e.g., binary search tree 822) with each page consolidation metadata log entry. While an example of a binary search tree has been provided, it will be appreciated that metadata log management 10 may organize a plurality of page consolidation metadata log entries using various types of data structures within the scope of the present disclosure.

In some implementations, metadata log management 10 processes 704 the page consolidation operation when at least a threshold number of page consolidation metadata log entries are generated. As discussed above, metadata log management 10 defers the processing of page consolidation operations from flushing to a background process when a threshold number of page consolidation operations are counted. For example, metadata log management 10 aggregates page consolidate operations in the form of metadata log entries (e.g., page consolidation metadata log entries) and maintains a counter (e.g., counter 820) of page consolidation metadata log entries generated. In some implementations, metadata log management 10 may compare the count value of counter 820 to a threshold number of page consolidation metadata log entries. The threshold may be user-defined (e.g., using a user interface), a default value (e.g., a percentage of the data container storage space), and/or may be automatically defined by metadata log management 10 (e.g., dynamically adjusted based on performance of metadata log 426 and/or storage array 112). In some implementations, metadata log management 10 may compare the count value of counter 820 to the threshold each time a page consolidation metadata log entry is generated.

In some implementations, processing 704 the page consolidation operation includes allocating 710 one or more additional pages in a list of pages. For example and as discussed above, metadata log management 10 defers processing of the page consolidation operations until at least a threshold number of page consolidation operations are identified. In some implementations, when processing 704 the page consolidation operation, metadata log management 10 processes each page consolidation metadata log entry (e.g., metadata log entry 818) to obtain the information concerning the page consolidation operation. For example, suppose that metadata log entry 818 includes information concerning a merge operation for metadata pages 808 and 812. In this example, metadata log management 10 identifies the next data container(s) or bucket(s) to destage from metadata log 426 and reads the counter (e.g., counter 820) for a number of page consolidation metadata log entries. In response to determining that the count value exceeds the predefined threshold, metadata log management 10 allocates 710 one or more additional pages in a page list (e.g., page list 824) as required for the number of candidate pages identified in the page consolidation metadata log entries. As discussed above, allocating pages includes identifying available metadata pages from the metadata page store to allocate for page consolidation operations. For example, in a merge operation, metadata log management 10 may allocate 710 a new metadata page for storing the contents of the pre-merged metadata pages and/or metadata page deltas.

In some implementations, metadata log management 10 may fill 712 the one or more additional pages from the list of pages with plurality of candidate pages based upon, at least in part, the binary search tree. For example, metadata log management 10 traverses the binary search tree (e.g., binary search tree 822) and fills 712 the one or more additional pages from the list of pages (e.g., page list 824). In this example, commits the metadata pages from page list 824 and marks the associated data containers or buckets as destaged.

As discussed above, metadata log management 10 is able to aggregate multiple candidate metadata pages across different flush processes, and write them contiguously into page lists. Accordingly, the allocation of pages is as-needed. Further, fewer write operations of page lists are needed and lock access is reduced by deferring these page consolidation operations. In this manner, the resources that are required by conventional flushing approaches to allocate and access merge list pages are reduced and replaced by a simpler operation of metadata log entry insertion. With these metadata log entries driving page consolidation operations, the metadata destage process is able to handle page consolidation work with better scalability, as opposed to during flushing which is limited by its ring-based structure.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    identifying a plurality of candidate pages associated with a page consolidation operation;
    generating a metadata log entry with information concerning the page consolidation operation, thus defining a page consolidation metadata log entry; and
    processing the page consolidation operation when at least a threshold number of page consolidation metadata log entries are generated, wherein processing the page consolidation operation includes:
  maintaining a counter of the page consolidation metadata log entries,
  incrementing a count value of the counter of the page consolidation metadata log entries for each page consolidation metadata log entry generated,
  comparing the count value of the counter against the threshold number of the page consolidation metadata log entries to determine whether to process the page consolidation operations represented by the page consolidation metadata log entries, and
  decrementing the count value of the counter for each processed page consolidation metadata log entry.

2. The computer-implemented method of claim 1, wherein identifying the plurality of candidate pages includes identifying the plurality of candidate pages during flushing of the plurality of candidate pages to persistent storage.

3. The computer-implemented method of claim 1, wherein the page consolidation operation is a merge operation.

4. The computer-implemented method of claim 1, wherein the page consolidation operation is a garbage collection operation.

5. The computer implemented method of claim 1, wherein generating the page consolidation metadata log entry includes generating a binary search tree including each page consolidation metadata log entry.

6. The computer implemented method of claim 5, wherein processing the page consolidation operation includes allocating one or more additional pages in a list of pages.

7. The computer implemented method of claim 6, further comprising:
  filling the one or more additional pages from the list of pages with the plurality of candidate pages based upon, at least in part, the binary search tree.

8. A computer program product residing on a non-transitory computer readable medium having a plurality of instructions stored thereon which, when executed by a processor, cause the processor to perform operations comprising:
  identifying a plurality of candidate pages associated with a page consolidation operation;
  generating a metadata log entry with information concerning the page consolidation operation, thus defining a page consolidation metadata log entry; and
  processing the page consolidation operation when at least a threshold number of page consolidation metadata log entries are generated, wherein processing the page consolidation operation includes:
    maintaining a counter of the page consolidation metadata log entries,
    incrementing a count value of the counter of the page consolidation metadata log entries for each page consolidation metadata log entry generated,
    comparing the count value of the counter against the threshold number of the page consolidation metadata log entries to determine whether to process the page consolidation operations represented by the page consolidation metadata log entries, and
    decrementing the count value of the counter for each processed page consolidation metadata log entry.

9. The computer program product of claim 8, wherein identifying the plurality of candidate pages includes identifying the plurality of candidate pages during flushing of the plurality of candidate pages to persistent storage.

10. The computer program product of claim 8, wherein the page consolidation operation is a merge operation.

11. The computer program product of claim 8, wherein the page consolidation operation is a garbage collection operation.

12. The computer program product of claim 8, wherein generating the page consolidation metadata log entry includes generating a binary search tree including each page consolidation metadata log entry.

13. The computer program product of claim 12, wherein processing the page consolidation operation includes allocating one or more additional pages in a list of pages.

14. The computer program product of claim 13, wherein the operations further comprise:
  filling the one or more additional pages from the list of pages with the plurality of candidate pages based upon, at least in part, the binary search tree.

15. A computing system comprising:
  a memory; and
  a processor configured to identify a plurality of candidate pages associated with a page consolidation operation, wherein the processor is further configured to generate a metadata log entry with information concerning the page consolidation operation, thus defining a page consolidation metadata log entry, wherein the processor is further configured to process the page consolidation operation when at least a threshold number of page consolidation metadata log entries are generated, and wherein processing the page consolidation operation includes the processor is further configured to: maintain a counter of the page consolidation metadata log entries, increment a count value of the counter of the page consolidation metadata log entries for each page consolidation metadata log entry generated, compare the count value of the counter against the threshold number of the page consolidation metadata log entries to determine whether to process the page consolidation operations represented by the page consolidation metadata log entries, and decrement the count value of the counter for each processed page consolidation metadata log entry.

16. The computing system of claim 15, wherein identifying the plurality of candidate pages includes identifying the plurality of candidate pages during flushing of the plurality of candidate pages to persistent storage.

17. The computing system of claim 15, wherein the page consolidation operation is a merge operation.

18. The computing system of claim 15, wherein the page consolidation operation is a garbage collection operation.

19. The computing system of claim 15, wherein generating the page consolidation metadata log entry includes generating a binary search tree including each page consolidation metadata log entry.

20. The computing system of claim 19, wherein processing the page consolidation operation includes allocating one or more additional pages in a list of pages.

* * * * *